United States Patent [19]

Sevrain et al.

[11] Patent Number: 5,235,821
[45] Date of Patent: Aug. 17, 1993

[54] METHOD AND APPARATUS FOR REFRIGERANT RECOVERY

[75] Inventors: Christophe J. Sevrain, Ridgefield, Wash.; Bonnie C. Lambert, Hood River, Oreg.

[73] Assignee: Micropump Corporation, Vancouver, Wash.

[21] Appl. No.: 999,606

[22] Filed: Dec. 31, 1992

[51] Int. Cl.⁵ .............................................. F25B 45/00
[52] U.S. Cl. ........................................ 62/149; 62/292; 417/44
[58] Field of Search ............. 62/77, 149, 292, DIG. 2; 417/13, 32, 44

[56] References Cited

U.S. PATENT DOCUMENTS

| | | | |
|---|---|---|---|
| 3,232,070 | 2/1966 | Sparano | 62/149 |
| 3,824,045 | 7/1974 | Wisniewski et al. | 418/30 |
| 4,285,126 | 8/1981 | Koser | 62/149 |
| 4,441,901 | 4/1984 | Endoh | 62/160 |
| 4,512,728 | 4/1985 | Nakano et al. | 418/3 |
| 4,558,998 | 12/1985 | Kiyoshige et al. | 418/26 |
| 4,646,527 | 3/1987 | Taylor | 62/85 |
| 4,671,075 | 6/1987 | Iijima et al. | 62/196.1 |
| 4,688,390 | 8/1987 | Sawyer | 62/160 |
| 4,697,990 | 10/1987 | Dantlgraber et al. | 417/204 |
| 4,766,733 | 8/1988 | Scuderi | 62/77 |
| 4,768,347 | 9/1988 | Manz et al. | 62/149 |
| 4,794,762 | 1/1989 | Orth et al. | 62/203 |
| 4,809,520 | 3/1989 | Manz et al. | 62/292 |
| 4,835,976 | 6/1989 | Torrence | 62/115 |
| 4,856,290 | 8/1989 | Rodda | 62/149 |
| 4,938,031 | 7/1990 | Manz et al. | 62/145 |
| 4,944,160 | 7/1990 | Malone et al. | 62/180 |
| 4,958,992 | 9/1990 | Winiger | 418/29 |
| 4,981,020 | 1/1991 | Scuderi | 62/77 |
| 5,020,331 | 6/1991 | Michny | 62/77 |
| 5,096,390 | 3/1992 | Serurain et al. | 417/420 |
| 5,097,667 | 3/1992 | Gramkow | 62/77 |
| 5,141,418 | 8/1992 | Ohtaki et al. | 418/26 |
| 5,157,936 | 10/1992 | Wall | 62/292 |
| 5,161,385 | 11/1992 | Schumacher | 62/127 |

*Primary Examiner*—John M. Sollecito
*Attorney, Agent, or Firm*—Klarquist, Sparkman, Campbell, Leigh & Whinston

[57] ABSTRACT

Refrigerant is recovered using a single pump unit, regardless of the refrigerant's phase. This is achieved by sensing the phase of the refrigerant and changing the pump's operation accordingly. The refrigerant phase can be sensed by a temperature-responsive element, such as a thermistor, or by other phase-sensing technology. In a preferred embodiment, the pump unit is a vane pump whose rotational speed is changed in response to the refrigerant's phase. If liquid refrigerant is sensed, the pump operates at a lower speed. If gas refrigerant is sensed, the pump operates at a higher speed. The two speeds are chosen so that the pump will draw an EPA-specified vacuum on the refrigerant present. In other vane-pump embodiments, the pump's operation is changed by changing the pump's mechanical configuration, rather than its rotational speed.

13 Claims, 1 Drawing Sheet

METHOD AND APPARATUS FOR REFRIGERANT RECOVERY

FIELD OF THE INVENTION

The present invention relates to refrigerant recovery systems, and more particularly relates to methods and apparatuses for removing refrigerant simply and efficiently regardless of whether the refrigerant is in a liquid or gas phase.

BACKGROUND AND SUMMARY OF THE INVENTION

Refrigerants have been in widespread use for over fifty years. In the past decades, the deleterious effects of the refrigerants on the environment have become apparent. Most widely discussed has been the depletion of the earth's ozone layer caused by chemical reactions between ozone and refrigerants such as freon and other chlorofluorocarbons (CFCs) and hydrochlorofluorocarbons (HCFCs).

The industry is addressing these concerns by reformulation of refrigerants to reduce their damaging effects. However, there exist millions of tons of harmful refrigerants still in use. Automobile air conditioning units and refrigerators are but two of the most common uses.

To address this latent threat, the US Environmental Protection Agency (EPA) has implemented regulations concerning recovery of used refrigerants when equipment is recharged, repaired or decommissioned. Among other requirements, these standards require that refrigerants be evacuated from such systems to specified vacuum pressures, the specific pressure depending on the type of equipment and the specific refrigerant involved.

The technology for evacuating refrigerants is well developed. In the patent literature, the technology can be traced back at least thirty years (see, for example, U.S. Pat. No. 3,232,070). With the onset of EPA regulation, the past decade has seen a storm of developments (see, for example, U.S. Pat. Nos. 4,285,206, 4,646,527, 4,768,347, 4,809,520, 4,856,290, 4,938,031, 5,033,271, 5,038,578, 5,097,667, 5,157,936, and 5,161,385).

Despite the massive research and development that has taken place, all of the prior art systems known to the applicants share a common failing: they are ill-suited to cope with refrigerants that may be encountered in either the liquid or gas phase.

Most prior art systems capable of evacuating both liquids and gases followed one of two approaches. The first integrates two evacuation circuits into a single apparatus, one circuit tailored for handling liquid, the other tailored for handling gas. The second employs means (often an evaporator) for converting the incoming refrigerant to a desired phase, and provides a single evacuation circuit tailored to handling that phase. It will be recognized that both of these approaches suffer by reason of increased cost, complexity, weight and size, and reduced reliability.

In accordance with the present invention, refrigerant is recovered using a single pump unit, regardless of the refrigerant's phase. This feat is achieved by sensing the phase of the refrigerant and changing the pump's operation accordingly. The refrigerant phase can be sensed by a temperature-responsive element, such as a thermistor, or by other phase-sensing technology.

In a preferred embodiment, the pump unit is a vane pump whose rotational speed is changed in response to the refrigerant's phase. If liquid refrigerant is sensed, the pump operates at a lower speed. If gas refrigerant is sensed, the pump operates at a higher speed. The two speeds are chosen so that the pump will draw an EPA-specified vacuum on the refrigerant present.

In other vane-pump embodiments, the pump's operation is changed by changing the pump's mechanical configuration, rather than its rotational speed.

In one embodiment of the invention, the pump and its associated motor are integrated into a single assembly that obviates the need for dynamic bearing seals.

The foregoing and additional features and advantages of the present invention will be more readily apparent from the following detailed description thereof, which proceeds with reference to the accompanying drawings.

DETAILED DESCRIPTION

To provide a comprehensive disclosure without unduly lengthening this specification, applicants incorporate by reference the disclosures of the patents noted in the Background section and in the following discussion.

The present invention is illustrated with reference to a preferred embodiment thereof, namely a vane pump with a speed-based control mechanism. It will be recognized, however, that the invention can take a number of other forms, some using different pump types, and others using different control mechanisms.

Figure 1:
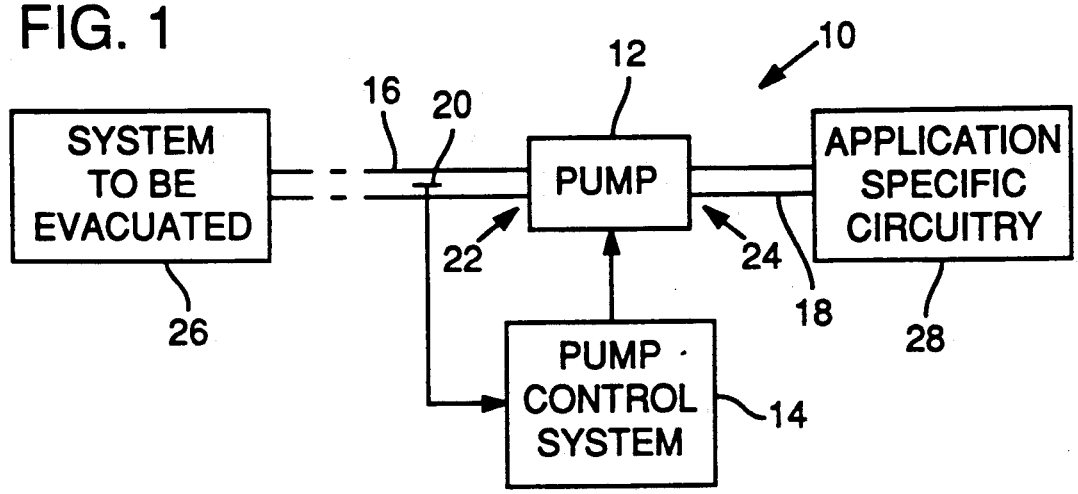
FIG. 1 is a block diagram of an refrigerant evacuating system according to one embodiment of the present invention.

Referring to FIG. 1, an apparatus 10 according to the preferred embodiment of the present invention includes a pump unit 12, a pump control system 14, an inlet conduit 16, an outlet conduit 18, and a sensor 20. The pump includes an inlet 22 and an outlet 24. The inlet conduit 16 couples the inlet of the pump to a system 26 to be evacuated. Included in the inlet conduit 16 is the sensor 20. The outlet conduit 18 couples the outlet of the pump to application-specific hydraulic circuitry 28.

The illustrated phase sensor 20 is a self-heated thermistor. In the illustrated embodiment, the thermistor is a 100 ohm unit available from Eaton Corporation of Carol Stream, Ill. as part number 189519. When liquid is present in inlet conduit 16, heat given off by current passing through the thermistor is quickly conducted away, keeping the thermistor cooler than when gas—a poor thermal conductor—is present. The resistance of the thermistor varies accordingly. This difference provides the basis by which the liquid and gas phases are distinguished.

(The use of thermistors to distinguish gas from liquids in refrigeration systems is further detailed in U.S. Pat. Nos. 4,944,160, 4,835,976, and 4,794,762.)

It will be recognized that other devices and technologies can be employed to determine whether liquid or gas is in the conduit 16. Some such alternatives include resistivity sensors, float sensors and weight sensors. As will be apparent, the principles of the present invention can be used with any device or mechanism that can distinguish liquid and gas phases.

Figure 2:
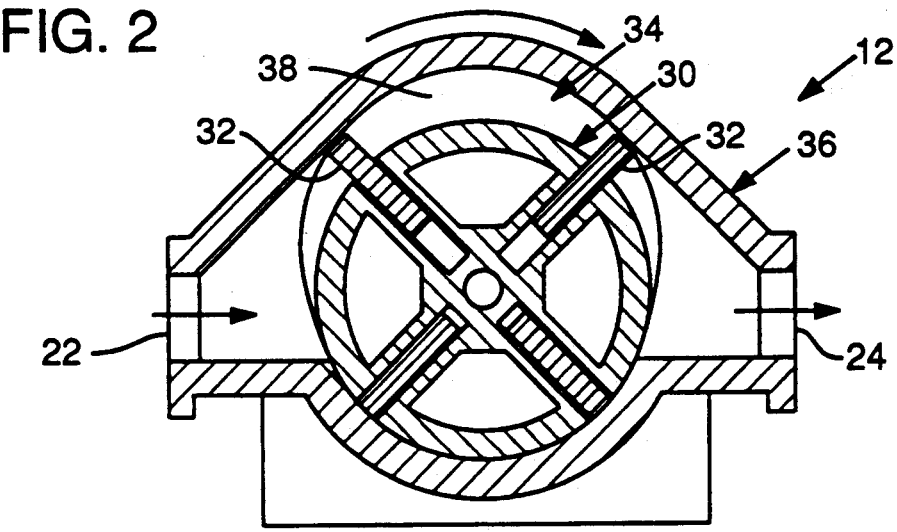
FIG. 2 is a simplified illustration of a vane pump suitable for use with the embodiment of FIG. 1.

Vane pumps are well known in the art and their construction and operation is thus not belabored here. A simplified illustration is provided in FIG. 2 and depicts a hub 30 having a plurality of blades 32 slidably mounted therein and radially extending therefrom. The hub is eccentrically mounted in a chamber 34 defined by a housing 36. The housing 36 also defines the pump's inlet 22 and outlet 24.

In operation, the pump's blades 32 are thrown outwardly (under centrifugal force, sometimes aided by spring loading or other biasing) and seal against the wall of the chamber 34. The pocket space 38 between adjacent blades alternately expands and contracts in volume as the length of the blades follows the inside wall of the chamber. The difference in pressure between the large and small pocket spaces 38 causes fluid to be pumped from the inlet 22 to the outlet 24.

In the preferred embodiment, the vane pump is of stainless steel construction to minimize the chance of adverse chemical reaction with the wide variety of refrigerants that may be encountered. Vane pumps of other materials can, of course, be used.

Vane pumps, like most pumps, require a source of motive rotary power. In the illustrated embodiment, this rotary power is provided by a brushless DC motor of the type and configuration disclosed in U.S. Pat. No. 5,096,390 and in allowed copending application Ser. No. 07/832,041, both to Sevrain et al and both incorporated herein by reference. The patented arrangements are advantageous in that they combine a motor and a pumping unit into an integrated assembly 12 within a closed housing, thereby eliminating the requirement for dynamic bearing seals. This arrangement thus reduces system complexity and increases system reliability.

The foregoing patent and patent application also disclose speed control circuitry by which the speed of the motor can be varied. In particular, the disclosed control circuitry includes a Motorola MC33035 brushless DC motor control circuit 40 which controls motor speed in response to a voltage applied to its pin 11.

Figure 3:
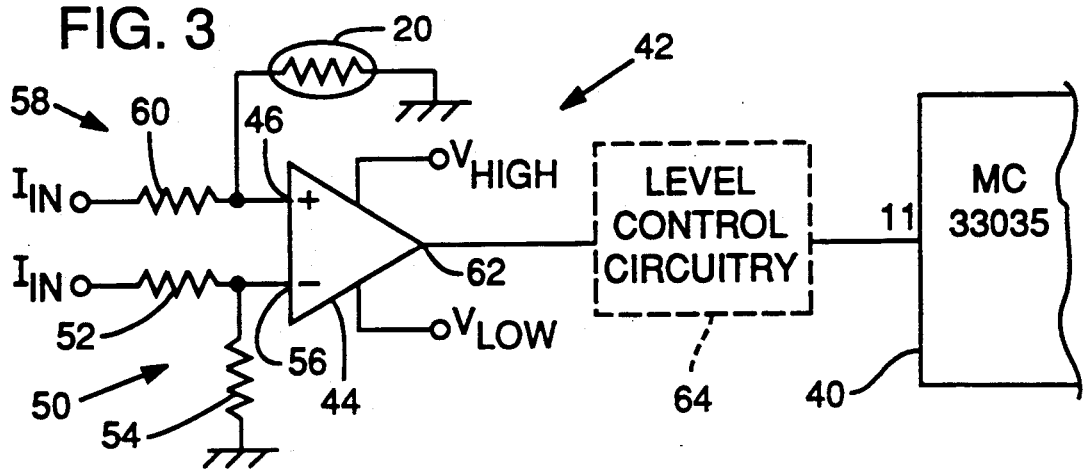
FIG. 3 is a schematic diagram showing a phase sensing element and associated electronics used in a pump control circuit in the embodiment of FIG. 1.

In the depicted embodiment, the thermistor 20 is used as a control element to provide one of two speed-control voltages to the motor control circuitry. This can be done by an operational amplifier (op-amp) threshold comparator circuit 42, shown in simplified form in FIG. 3. The op-amp 44 is powered by differential supply voltages $V_{LOW}$ and $V_{HIGH}$. The voltage on the inverting input 56 of the op-amp 44 is set by a resistive divider circuit 50 that includes a resistor 52 and a resistor 54. The voltage on the non-inverting input 46 of the op-amp 44 is set by a second divider circuit 58 that includes sensor thermistor 20 and an additional resistor 60. Both networks 50 and 58 are driven with a constant current signal $I_{IN}$.

If resistors 60 and 52 have the same values, then the circuit 42 will operate to compare the resistance provided by the thermistor 20 with that provided by resistor 54. If the thermistor resistance is less, the voltage at the non-inverting input 46 will be lower than at the inverting input 56, causing the output 62 of the op-amp to swing to $V_{LOW}$. If the thermistor resistance is greater, the output 62 will conversely swing to $V_{HIGH}$. In some applications, $V_{LOW}$ and $V_{HIGH}$ can be selected to directly provide the first and second speed-control voltages desired at pin 11 of the motor control circuitry 40. In other applications, level control circuitry 64 can be employed to provide the desired voltages.

(It will be recognized that the foregoing circuitry is rudimentary and is subject to numerous refinements and extensions, depending on the application. In a simple refinement, resistor 54 may be a variable resistor to provide a variable comparison point. In a related refinement, resistor 54 is itself a thermistor so as to assure intended operation over a wide range of ambient temperatures. A number of other circuit configurations will be apparent to those of ordinary skill in the art.)

The sizing of the vane pump and the selection of its operational speeds will be application dependent. For servicing of automotive air conditioners, liquid flow rates on the order of 0.5 gal/min may be most appropriate. Servicing of commercial HVAC equipment, in contrast, may require flow rates orders of magnitude higher.

The differential between rotational speeds used with liquid versus gas refrigerant will depend on the particular pump configuration utilized and the vacuum that is required to be drawn. Generally speaking, the rotational speed for pumping gas will be at least twice that for pumping liquid, and in some instances may be on the order of ten times greater. In an exemplary embodiment, using a vane pump with a hub diameter of 5 inches, four blades, a blade width of 0.75 inches, and a maximum chamber diameter of 6 inches, a vacuum of 29 inches of mercury can be drawn on both gaseous and liquid refrigerants.

EPA guidelines that are proposed to take effect on Jan. 1, 1993, specify different evacuation requirements depending on the class of equipment. For high pressure equipment (i.e. R-12, R134A, R-22 and R-500 systems) having a refrigerant charge less than 50 pounds, the equipment must be evacuated to a vacuum of 10 inches of mercury. For such systems that have a refrigerant charge greater than 50 pounds, a vacuum of 20 inches will be required. For very high pressure equipment (i.e. R-13 and R-503 systems), a Vacuum of 0 inches is required. For intermediate, pressure equipment, a vacuum of 25 inches of mercury will be required. For low pressure equipment (i.e. R-11 and R-123 systems), a vacuum of 29 inches of mercury will be required. Each of these requirements can be achieved by evacuation systems according to the present invention.

While the above-described embodiment utilizes an electronic speed control circuit, it will be recognized that speed control can be effected in other manners. For example, the mechanical linkage coupling the motor to the pump hub can be arranged to change the ratio of motor shaft rotation to hub rotation (e.g. by gears or the like), thereby effecting speed change. Again, this speed change can be made responsive to the sensed phase of the refrigerant.

Still other embodiments vary the capacity of the pump without changing its rotational speed. In vane pumps, for example, the pump hub can be moved within its rotational chamber, changing the nature of the eccentric mounting. This, in turn, changes the ratio of the maximum pocket volume to minimum pocket volume, thereby changing pump throughput. In other vane pump embodiments, the pump blade configuration can be changed to vary pump capacity. For example, a magnetic drive mechanism can be operated to selectably extend blades from, or retract blades into, the hub so as to vary pump capacity. U.S. Pat. Nos. 5,141,418, 4,958,992, 4,697,990, 4,558,998, 3,824,045 detail a variety of suitable variable capacity vane pump configurations. These and other mechanical arrangements for changing a pump's capacity can be activated through suitable control systems responsive to a signal from phase sensor 20 and can advantageously be employed in combinations according to the present invention.

The application-specific hydraulic circuitry 28 can include a variety of known recovery, recycling and other processing devices, depending on the particular application contemplated. In some instances, certain of this further hydraulic circuitry is phase-dependent and is selectably switched into or out of the circuit by valves responsive to signals from the sensor 20.

Desirably, the apparatus 10 includes some portability feature to facilitate movement of the assembly by a service technician. In handheld models, such as those weighing under 50 pounds, a simple handle on the top of the unit will suffice. In larger models, such as those of up to 200 pounds in weight, the apparatus can be constructed on a small, wheeled cart. (Cart-based refrigerant recovery systems are shown in U.S. Pat. Nos. 4,768,347, 4,809,520, 4,938,031 and 5,157,936.)

Having illustrated and described the principles of our invention with reference to a preferred embodiment and several variations thereof, it should be apparent to those skilled in the art that the invention can be modified in arrangement and detail without departing from such principles. For example, while the invention has been illustrated with reference to a vane pump-based embodiment, it will be apparent that a variety of other pump types can alternatively be used. Rotary piston pumps and diaphragm pumps are but two such alternative choices. Similarly, while the invention has been illustrated with reference to an integrated motor/pump assembly, it will be recognized that a variety of other pump drive techniques can be employed. Among these are magnetic drive systems of the sort disclosed in U.S. Pat. Nos. 3,238,883 and 4,111,614. Still further, while the invention has been illustrated with reference to a DC variable speed motor, it will be recognized that the invention can be practiced with other types of motors, including AC and air-powered.

In view of the many possible embodiments to which the principles of our invention may be put, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. An apparatus for recovering refrigerant from a system, the apparatus comprising:
   a vane pump, the vane pump including a central hub having a plurality of blades extending therefrom, the hub and blades being mounted for rotary motion in a chamber defined by a housing, the vane pump including an inlet and an outlet;
   a motor, the motor being coupled to the hub of the vane pump for imparting rotary motion thereto;
   a conduit coupling the inlet of the vane pump to the system;
   a phase sensor positioned to determine the phase of the refrigerant passing from the system to the pump, the sensor producing an output signal corresponding thereto; and
   pump control means coupled to the sensor and serving to change the capacity of the pump depending on whether the sensor senses the refrigerant is in gas or liquid phase.

2. The apparatus of claim 1 in which the sensor comprises a thermistor disposed in the conduit.

3. The apparatus of claim 1 in which the motor and the pump are integrated into a single assembly, thereby obviating the need for dynamic bearing seals.

4. The apparatus of claim 1 in which the pump control means comprises a motor control system responsive to the signal from the sensor to change the speed of hub rotation depending on whether the sensor senses the refrigerant is in gas or liquid phase.

5. The apparatus of claim 4 in which the motor control system comprises an electronic motor control circuit.

6. The apparatus of claim 4 in which the motor control system rotates the hub at least twice as fast when gas phase refrigerant is detected than when liquid phase refrigerant is detected.

7. The apparatus of claim 1 in which the pump control means includes means for changing the mechanical configuration of the pump in response to the signal from the sensor.

8. The apparatus of claim 7 in which the pump control means includes means for extending one or more blades from the hub to increase pump capacity when the sensor senses gas phase refrigerant in the conduit.

9. The apparatus of claim 7 in which the pump control means includes means for retracting one or more blades into the hub to reduce pump capacity when the sensor senses liquid phase refrigerant in the conduit.

10. The apparatus of claim 7 in which the pump control means includes magnetic means for moving pump blades in response to the signal from the sensor.

11. The apparatus of claim 1 which further includes a refrigerant processing circuit coupled to the outlet of the pump, and portability means facilitating movement of the apparatus.

12. An apparatus according to claim wherein the apparatus weighs less than 50 pounds, and in which the portability means includes a handle facilitating movement of the apparatus by a service technician.

13. An apparatus according to claim 11 wherein the apparatus weighs less than 200 pounds, and in which the portability means includes wheels facilitating movement of the apparatus by a service technician.

* * * * *